INVENTOR
Henry de Beaumont
BY
ATTORNEY

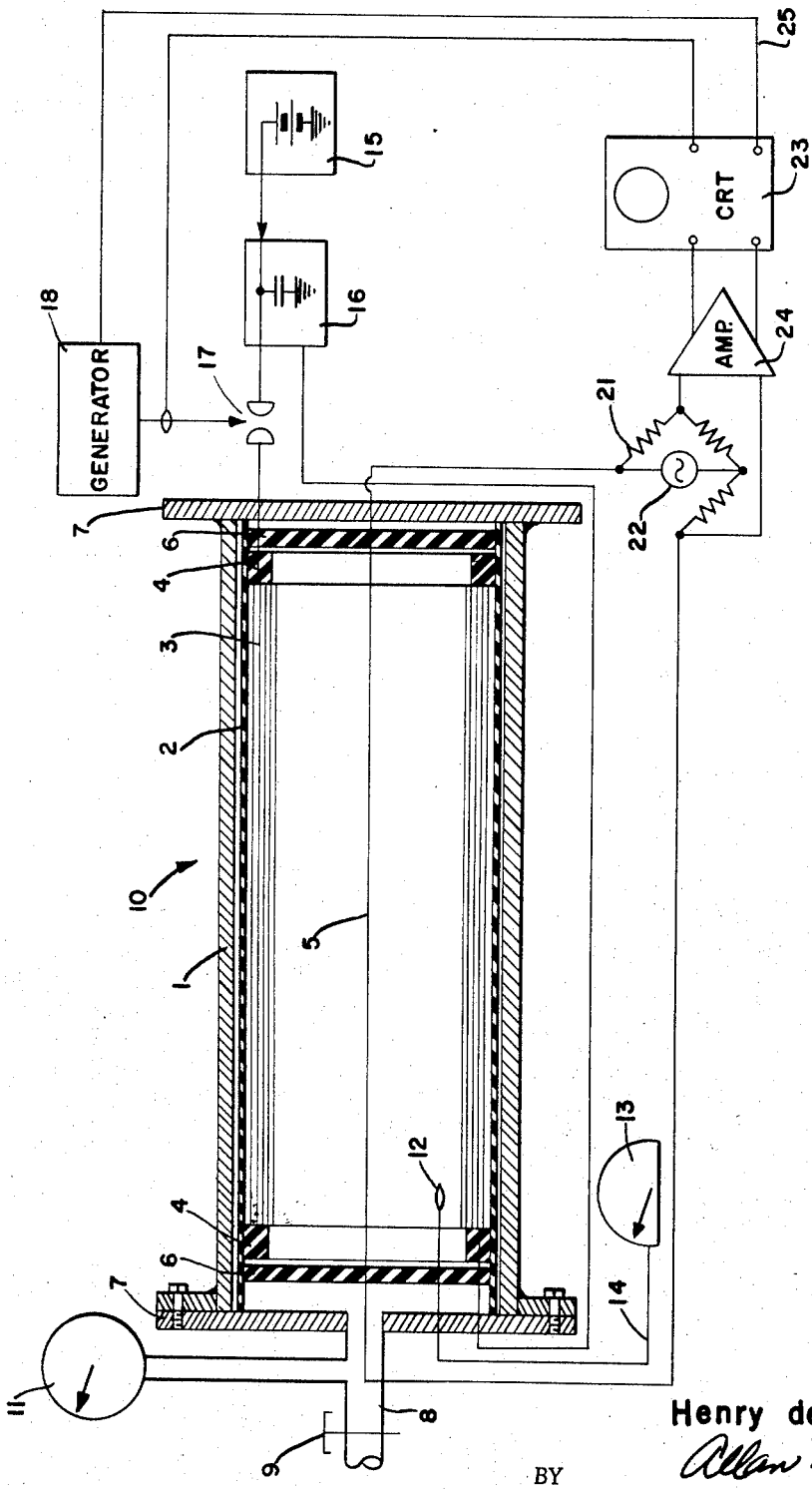
FIG. I.
INVENTOR
Henry de Beaumont

United States Patent Office 3,426,596
Patented Feb. 11, 1969

3,426,596
METHODS OF AND APPARATUS FOR DETERMINING PROPAGATION CHARACTERISTICS OF THERMIC WAVES IN GASES AND ITS APPLICATION TO TEMPERATURE MEASUREMENTS
Henry de Beaumont, Nazelles, France, assignor to Société pour l'Utilisation Rationnelle des Fluides
Filed Mar. 29, 1966, Ser. No. 538,430
U.S. Cl. 73—339                                   15 Claims
Int. Cl. G01k 3/00

The present invention relates generally to methods of and apparatus for determining the characteristics of thermic waves propagating through a gaseous medium, and more particularly to a method of and apparatus for determining the temperature at which the thermic wave is emitted by ascertainment of the wave front propagation velocity.

The present invention is based upon my discovery that the local velocity of a thermic or thermal wave front as it propagates, by conduction, through a gaseous medium depends upon the temperature and pressure of the medium at any point through which the wave is traversing. In particular, I have found that the square of the local velocity of thermal propagation through a gas is proportional to the temperature and conductivity and inversely proportional to the pressure of the gas at the considered point.

It can be validly assumed that pressure is maintained constant throughout a particular gaseous medium, whereby thermic wave front propagation velocity remains constant as the wave propagates through the gaseous medium being considered. Since wave front propagation velocity is constant throughout the gaseous medium being considered, wave front propagation velocity is measured by the propagation time between a pair of spaced predetermined points in the gas.

My experiments show that the local propagation velocity of a thermic wave, by conduction, through a gaseous medium, C, at any point in the medium, is a function of the thermal conductivity of the medium, $\lambda$, the specific heat capacity of the medium, at constant volume per unit mass, $c$, the density of the medium at the point through which the thermic wave is propagating, $\rho$, and a characteristic constant of the gas, having as a dimensional unit time, $k$. These parameters are interrelated in accordance with:

$$C = \sqrt{\frac{\lambda}{c\rho k}} \qquad (1)$$

It is to be recalled that the thermal conductivity of a medium, $\lambda$, is the time rate of heat transfer by conduction through a unit thickness across a unit area for a unit difference of temperature. Thermal conductivity is measured as watts per square meter for a thickness of 1 meter and a temperature difference of 1° C., in mks. units.

The constant $k$ in Equation 1, from the experimental data obtained, appears to be practically independent of temperature and pressure of the gaseous medium through which the thermic wave is propagating. Hence, the value of $k$ depends solely upon the nature of the gas through which thermic wave is propagating and is not apparently affected by the physical condition of the gas. It has been observed that different gases possess different values for the constant $k$, but most gases have a value on the order of a millisecond, although values as large as 100th of a second are possible.

Utilizing the value of $k=1$ millisecond, a rough calculation based upon Equation 1 yields local propagation velocities of a thermic wave on the order of 0.1 meter per second through a propagation medium of air maintained at room temperature and pressure. The calculated value in accordance with Equation 1 is confirmed by experimental results utilizing the apparatus described infra.

It is to be understood that the propagation of thermic wave fronts, by conduction, as described herein, is distinct from the phenomenon known as simultaneous infra-red radiation. Simultaneous infra-red radiation propagates at the speed of light and displays a much weaker effect in non-absorbing mediums than thermic conduction wave front propagations. In consequence, simultaneous infra-red radiation may be neglected in the calculations and detection processes described herein. The propagation of thermic wave fronts, by conduction, is also to be distinguished from the mode by which sound propagates through a gaseous medium. As Equation 1 indicates, thermic wave propagation velocity is a function of the temperature and pressure of the medium through which the wave travels, while sound wave propagation is a function only of the temperature of the medium, as is well known.

My discovery has led to the conclusion that the transfer in gases of what is imprecisely referred to as heat is always a propagation of thermic energy through a wave mechanism. The experiments I have conducted lead me to conclude that thermic energy is never propagated in gases by the mechanism known as diffusion, as was assumed previously. The term diffusion for thermic transfer mechanism results for the inability, with prior art devices and techniques, to measure the characteristics of thermic waves in gases accurately.

Analysis leads to the conclusion that the propagation of thermic energy through a gaseous medium is by a mechanism analogous to the propagation of electromagnetic energy through conductive long distance cables having capacity, self-inductance and resistance. In other words, the propagation of thermic energy through a gaseous medium is analogous to the propagation of a pulse through a distributed parameter delay line or transmission line. The analogy between propagation of electromagnetic energy through distributed parameter lines and the propagation of thermic waves through gases enables Equation 1 to be derived by rewriting the so-called telegraphy equation. The telegraphy equation is rewritten with the electrical impedance coefficients replaced by the corresponding heat propagation impedances. Using the analogy, the equation for propagating plane thermic waves through a gaseous medium is written, for example, at constant pressure as:

$$\frac{1}{c\rho k}(\lambda T_x)_x - T_{tt} - \frac{\gamma}{k}T_t = 0 \qquad (2)$$

wherein:

$x$ is the distance through which the thermic wave has propagated;
$t$ is time;
$T$ is temperature; and
$\gamma$ is the ratio of specific heat of the gas at constant pressure to the specific heat of the gas at constant volume.

The subscripts indicate that a derivative is to be taken with respect to a particular variable, e.g., the subscript $x$ indicates that a derivative is to be taken with respect to the distance through which the wave has propagated while the subscript $tt$ indicates that the function is to be differentiated twice with respect to time.

Equation 2 is simplified by assuming that conductivity, $\lambda$, varies slowly as a function of temperature, and hence can be rewritten as:

$$\frac{\lambda}{c\rho k}T_{xx} - T_{tt} - \frac{\gamma}{k}T_t = 0 \qquad (3)$$

Sham-linerization of Equation 3 enables Equation 1, supra, to be derived.

By recalling that in an ideal gas medium, $$p = c(\gamma - 1)\rho T \quad (4)$$

where $p$=pressure of the medium, substitution into Equation 1 yields wave local propagation velocity as:

$$C = \sqrt{\frac{(\gamma-1)T\lambda(T)}{kp}} \quad (5)$$

In Equation 5, the quantity T is the temperature of the gaseous medium at the considered point. A routine calculation from Equations 3 and 5 yields as the value for the propagation velocity of the thermic wave front:

$$C_F = \sqrt{\frac{(\gamma-1)[T_1\lambda(T_1) - T_0\lambda_0(T_0)]}{kp}} \quad (6)$$

where:

$T_0$ is the initial temperature of the unaltered gaseous medium ahead of the wave front;
$T_1$ is the peak temperature of emission of the thermic wave; and
$\lambda_0$ is the thermal conductivity ahead of the wave front.

Equation 6 is utilized to determine the otherwise difficult to ascertain temperature, $T_1$, of emission of the thermic wave, by measuring the propagation time of a thermic wave between a pair of spaced, predetermined points in the gas. Once having determined the propagation time of the wave front through the gaseous medium between the points, the propagation velocity is easily calculated since the distance that the wave travels is known. In solving Equation 6, knowing the conductivity of the medium as a function of temperature, the parameters $p$ and $T_0$ having been measured, the constants $k$ and $\gamma$ being known for the considered gas, measuring the wave front propagation velocity, C, ascertains the temperature of emission $T_1$.

Equation 3, supra, is utilized to explain the statement that diffusion is incorrectly assumed as a heat transfer mode in gases. At room temperature and pressure, the value of $C^2$, the coefficient of $T_{xx}$, is on the order of $6 \times 10^{-3}$ meters per second squared, while the constant coefficient of $T_t$ has a value on the order of $$20 \times 10^{-3} \text{ sec.}^{-1}$$

When the gas through which the thermic wave propagates is at a very low pressure, for example, $10^{-1}$ Pascal (mks. units: 1 Pascal=1 Newton per square meter), a pressure of approximately $10^{-6}$ atmospheres, the value of $C^2$, with the gas maintained at room temperature, is $10^6$ times greater than under atmospheric conditions. If the low pressure gas is assumed to be the same medium as was considered before, the coefficient of $T_t$ has the same value of $20 \times 10^{-3}$ sec.$^{-1}$. Hence, at low pressure, the coefficient of $T_t$, $\gamma/k$, relating to distortion, is much less than the coefficient of $T_{xx}$, so the thermic energy wave propagates in a manner similar to the propagation of sound waves in gases and electromagnetic waves through ideal dielectrics. Experimental data, taken at the temperatures and pressures noted, have experimentally verified the analytical prediction that all thermic energy transfer by conduction in gases is a propagation by waves and not diffusion.

Because thermic propagation is through a wave mechanism, the normal reflecting properties of waves occur. Particularly, when two wave fronts meet each other, a suddenly changing, easily detected signal occurs. The sudden signal derived when two wave fronts meet each other is utilized, according to one apparatus embodiment of the present invention, to determine the temperature of emission of the wave. The embodiment involves transmitting a pulse type thermic wave through a gaseous medium from a heat source that is cylindrical in shape. The thermic energy propagated from the source travels radially toward the axis of the cylinder where a thermic detector is located. The time at which the thermic wave propagates past the detector is readily ascertained and compared with the time at which the energy was initially propagated from the source. By monitoring the temperature and pressure of the gaseous medium through which the heat wave propagates, and knowing the constants $k$ and $\gamma$, Equation 6 can be utilized to determine the emission temperature of the wave.

Another application of the present invention involves measuring the intensity of a thermic source. The intensity of a thermic source can be measured by coupling the energy of the source, as a thin, longitudinally propagated beam of energy through a gaseous medium, the temperature and pressure of which are monitored. The energy is coupled into the gaseous medium along the axis of cylindrical detecting element and causes a thermic wave to be transmitted to the detector.

By measuring the propagation velocity of the thermic wave front, one ascertains the temperature of the gas along the axis and consequently the intensity of the energy source. In a specific application, this apparatus is utilized to measure the intensity of a laser beam. If the laser beam cross-section is not sufficiently small, optical techniques are employed for focussing the beam into parallel rays that propagate through the detector axis with a reduced cross-sectional area.

It is an object of the present invention to provide a new and improved method of and apparatus for determining the temperature of emission of a thermic wave.

It is another object of the present invention to provide a method of and apparatus for measuring the temperature of emission of a thermic wave by relying upon the velocity of propagation of the wave front.

It is another object of the present invention to provide new and improved apparatus for measuring the intensity of a beam of energy.

It is a further object of the present invention to provide a method of and apparatus for measuring the temperature of emission of a thermic wave in response to the time interval required for the wave front to travel between a pair of predetermined points.

It is still another object of the present invention to provide a new and improved apparatus for measuring the intensity of a laser beam.

The above and still further objects, features and advantages of the present invention will become apparent upon consideration of the following detailed description of several specific embodiments thereof, especially when taken in conjunction with the accompanying drawings, wherein:

FIGURE 1 is a schematic diagram of the apparatus utilized for measuring temperature of emission of a thermic wave;

Figure 3:
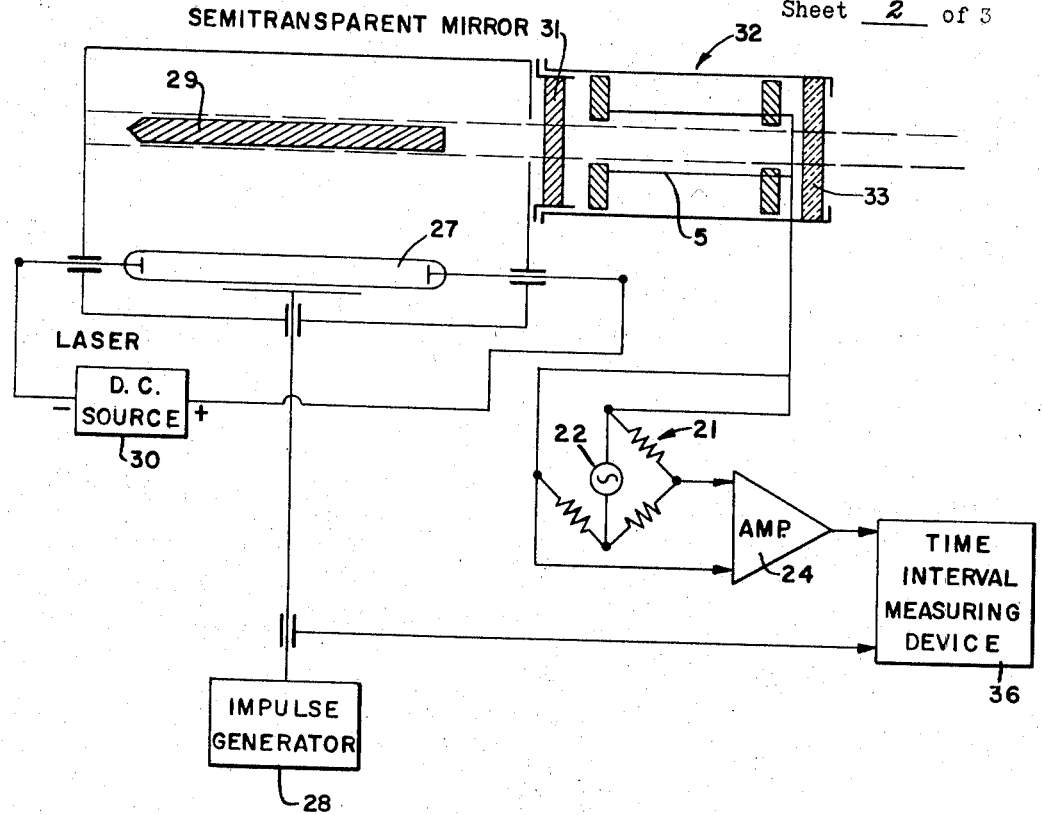
FIGURE 3 is a further embodiment of the present invention utilized for measuring the intensity of a laser beam according to the present invention.

Reference is now made to FIGURE 1 of the drawings wherein metal cylinder 1, having thin walls and a generally cylindrical cross-section is illustrated. Lining the inner wall of metal cylinder 1 is a further cylinder 2, fabricated from a high quality dielectric material exhibiting good electrical insulating properties. Within insulating liner 2 is cylindrical longitudinal coil 3, the wires of which are wound parallel to the cylinder axis, so that minimum electromagnetic energy is radiated thereby. Cylindrical coil 3 is coaxial with the longitudinally extending axes of metal cylinder 1 and dielectric sleeve 2 and is supported at each of its ends by dielectric insulating rings 4. Coincident with the axes of metal cylinder 1, insulating sleeve 2 and cylindrical coil 3, is bolometer wire 5, that is stretched between and extends through insulating disks 6, that are located on either side of disk 4. Heat responsive, variable resistance bolometer wire 5 is preferably fabricated from platinum having a circular cross-section of 0.01 millimeter diameter and a resistance of approximately 50 ohms between disks 6.

The volume within metal cylinder 1 is sealed by means of end plates 7 and appropriate weld joints, so that a gaseous medium, the constant, $k$, of which is known, can be maintained under constant pressure within the cylinder confines. The gas is fed into one side of cylinder 1 through stem 8 and valve 9.

The pressure of the gas is measured by means of conventional pressure gauge 11 that is coupled to inlet passage 8, while the temperature of the gas is monitored by inserting probe 12 in cylinder 1 between coil 3 and bolometer 5. The pressure of the gas within cylinder 1 is maintained constant, even when energy pulses are transmitted through the gas, by providing a sufficiently large volume for the gas to occupy. Probe 12 is connected to electric thermometer 13 by means of cable 14 that extends through an opening in disk 4 and suitable apertures in disks 6 and 7 at the left side of the chamber, as viewed in FIGURE 1.

A thermic wave is transmitted through the gaseous medium within metal cylinder 1 from cylindrical coil 3 by supplying the coil with a large, relatively short duration pulse of electrical energy. The electrical pulse is derived by connecting 2500-volt D.C. source 15 to the input terminal of capacitor bank 16. The shunt capacity of capacitor bank 16 is preferably within the range of 4-40 microfarads to derive pulses having a duration on the order of 5 milliseconds. The output terminal of capacitor bank 16 is connected to one electrode of spark discharge device 17, the control electrode of which is responsive to pulses derived from generator 18. The remaining electrode of spark discharge device 17 is connected to one end of coil 3, the other end of which is connected to the grounded output terminal of capacitor bank 16. In response to the derivation of a pulse by generator 18, spark discharge device 17 is ionized and the energy stored in capacitor bank 16 is transferred to coil 3, for a duration of approximately 5 milliseconds. During the 5 millisecond interval during which coil 3 is supplied with high intensity current from capacitor bank 16 and spark discharge device 17, a wave of thermic energy is propagated by conduction through the gas in vessel 10, radially toward bolometer wire 5.

Changes in the temperature at the center of vessel 10 are reflected as resistance variations of bolometer 5. The resistance of bolometer wire 5 is monitored by connecting the wire as one arm of normally balanced, resistive Wheatstone bridge 21 that is energized by a 50-cycle source 22 having a potential of approximately 12 volts RMS. Unbalances of bridge 21 are fed to the Y deflection plates of cathode ray oscilloscope 23 through A.C. amplifier 24. Oscilloscope 23 includes a linear sweep circuit for deflecting the cathode ray beam in the X direction to provide time of event indications. The X sweep circuit is activated by connecting the X deflection plates, capacitatively through connection 25, to the output lead of generator 18. The X sweep circuit of cathode ray oscilloscope 23 is thereby initiated simultaneously with propagation of the thermic wave from coil 3 toward bolometer wire 5. The vertical cathode ray deflection location along the X axis of oscilloscope 23 caused by bolometer 5 detecting the temperature rise accompanying the passage of the thermic front indicates the time interval required for the thermic front to propagate the known distance between coil 3 and wire 5.

Figure 2:
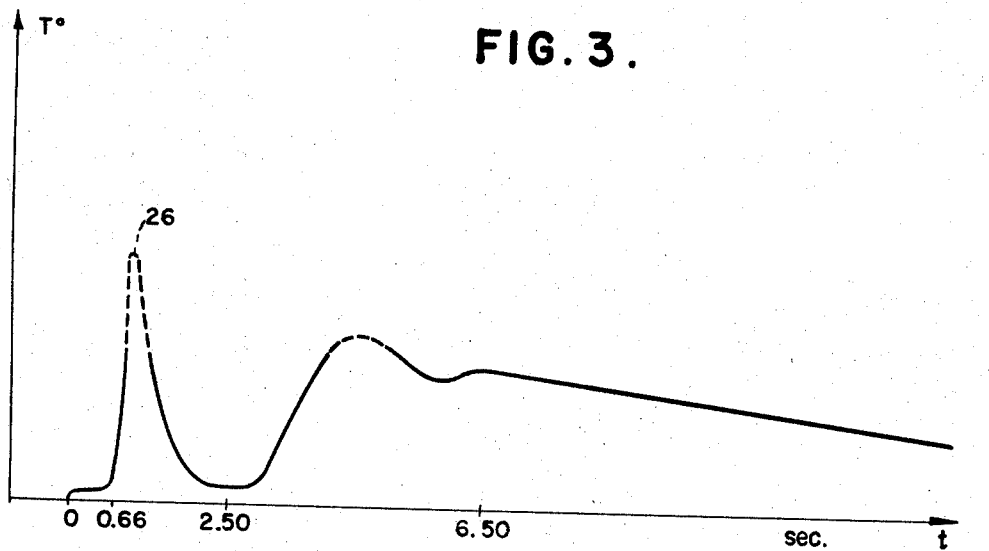
FIGURE 2 is a graph illustrating the response of the apparatus of FIGURE 1.

A reproduction of an oscilloscope plot utilizing the apparatus illustrated in FIGURE 1 is shown in FIGURE 2, wherein temperature, $T$, of bolometer wire 5 is plotted as a function of time, $t$. From FIGURE 2 it is noted that a slight rise in the temperature of bolometer wire 5 occurs almost immediately after coil 3 is energized. The slight increase in temperature of bolometer wire 5 is caused by the propagation of simultaneous infrared energy, transmitted by the same mechanism as light.

At a time 0.66 second after energization of coil 3, the thermic conduction wave begins propagating past bolometer 5. The temperature of bolometer 5 reaches a maximum value approximately 1 second after energization of coil 3, as indicated by peak point 26 on the curve of FIGURE 2. In the interval between approximately 1 and 2.5 seconds after energization of coil 3, the temperature of bolometer wire 5 decreases. The decrease in temperature of wire 5 in the interval between 1 and 2.5 seconds is due to the thermic wave fronts reflecting on each other when they merge at the axis of vessel 10. The increase in temperature of bolometer wire 5 which occurs after more than 2.5 seconds is due to further reflection of the wave propagation from the coil back towards the center of the gaseous medium.

Gauges 11 and 13 indicate the values of $p$ and $T_0$ in Equation 6, while the value of $C_F$ can be computed from the known distance between wire 5 and coil 3 and the time it takes for the thermic wave to propagate between the wire and coil. From these determined parameters and knowing, a priori, the values of $\gamma$ and $k$ for the gas within cylinder 1, the value of $T_1$ can be calculated using Equation 6. The determination of the temperature of emission of a thermic wave has useful applications in many of the physical sciences, for example in metrology.

Reference is now made to FIGURE 3 of the drawings wherein there is illustrated a further embodiment of the invention for measuring the intensity of a laser beam. The laser beam is generated by conventional apparatus comprising high intensity flash tube 27 that is energized by a relatively high voltage D.C. source 30 of electrical energy and impulse generator 28. In response to a pulse from source 28, flash tube 27 pumps ruby crystal 29 with high frequency energy that causes stimulated emission from the laser in the infra-red and visible light spectra. The coherent optical energy deriving from ruby crystal 29 is coupled through semi-transparent mirror 31 that forms a part of the laser optical resonant cavity, in a manner well-known to those skilled in the art. From semi-transparent mirror 31 the longitudinally propagated laser beam is transmitted along the longitudinal axis of detector 32.

Figure 4:
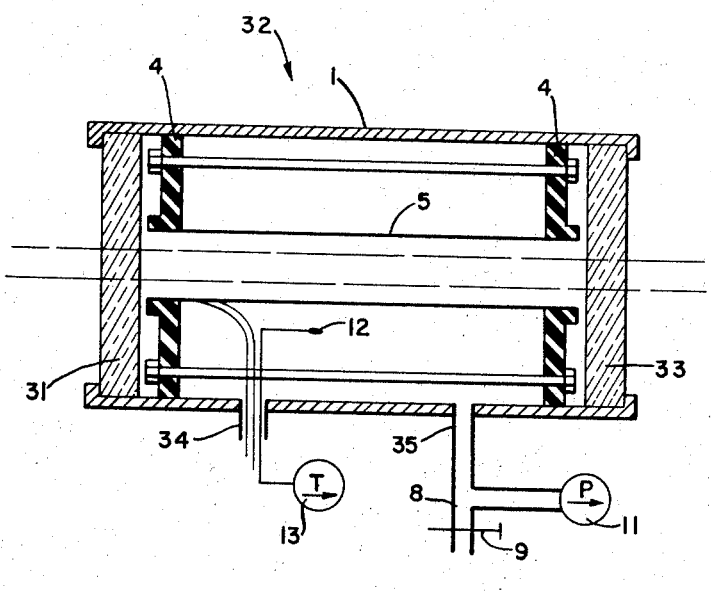
FIGURE 4 is a cross-sectional diagram of the detector of FIGURE 3, showing some of the apparatus in greater detail.

As indicated in greater detail by FIGURE 4, detector 32 comprises basically the same components as included in the combined source and detector of FIGURE 1. In the detector of FIGURE 4, however, bolometer wire 5 is formed as a coil having its longitudinal axis coincident with the axis of metal, cylindrical container 1, the interior of which is painted black to provide an opaque and non-reflecting surface to heat energy. As in the combined source and detector of FIGURE 1, the detector of FIGURE 4 includes appropriate meters 13 and 11 for measuring the initial temperature and pressure of the gas within cylinder 1. The detector of FIGURE 4 differs from the structure shown by FIGURE 1, however, since the former includes light transmitting end plates 31 and 33 for enabling the laser beam to be propagated through the detector. A further distinction is that ports 34 and 35 are provided on the side walls of cylinder 1 in the detector of FIGURE 4. Port 34 is utilized for enabling connections to be made to bolometer coil 5 and to temperature probe 12, within the detector chamber. Port 35 is utilized for feeding a gas having known values of $\gamma$ and $k$, Equation 6, into the sealed container comprising detector 32.

In operation, detector 32 is positioned with its longitudinal axis, hence the axis of bolometer coil 5, aligned with the longitudinal axis of crystal 29 of the ruby laser source. The electromagnetic energy emitted from ruby crystal 29 propagates along the longitudinal axis of the detector and causes a thermic wave to be propagated, by conduction, through the gas in detector 32. In response to the thermic wave, the temperature of bolometer 5 is increased approximately as indicated by FIGURE 2.

The time at which the temperature of bolometer 5, FIGURE 4, starts rising sharply relative to the time at which ruby crystal 29 begins lasing, is a function of the intensity of the light coupled through semi-transparent mirror 31 to the gas within detector 32. From Equation 6, the temperature of emission of the thermic wave, $T_1$, i.e., the temperature of the gas along the axis of detector 32, is calculated to indicate the intensity, hence energy, of the laser output beam.

Detection of the time at which the thermic wave passes bolometer coil 5 is made by connecting the bolometer coil in one arm of normally balanced Wheatstone bridge 21, in the same manner as indicated by FIGURE 1. The Wheatstone bridge output is coupled through A.C. amplifier 24 to one input of time interval measuring device 36. The other input of time interval measuring device 36 is capacitively coupled to the output of impulse generator 28.

Time interval measuring device 36 may be a cathode ray oscilloscope, as shown by FIGURE 1, or it may employ a rectangular wave generator, the leading edge of which is derived in response to an impulse from source 28. The trailing edge of the rectangular wave generated by time interval measuring device 36 is derived in response to bridge 21 becoming unbalanced. The leading and trailing edges of the rectangular wave output of time interval measuring device 36 are employed for starting and stopping a suitable electronic clock.

In many instances, the detector of FIGURE 4 is not suitable for measuring the intensity of a laser beam because the cross-sectional area of the beam is too large. Of course, in order for the detector of FIGURE 4 to function properly, it is necessary for the cross-sectional area of the laser beam to be as small as possible so that wave front propagation from the axis of detector 32 to coil 5 can be precisely ascertained.

Figure 5:
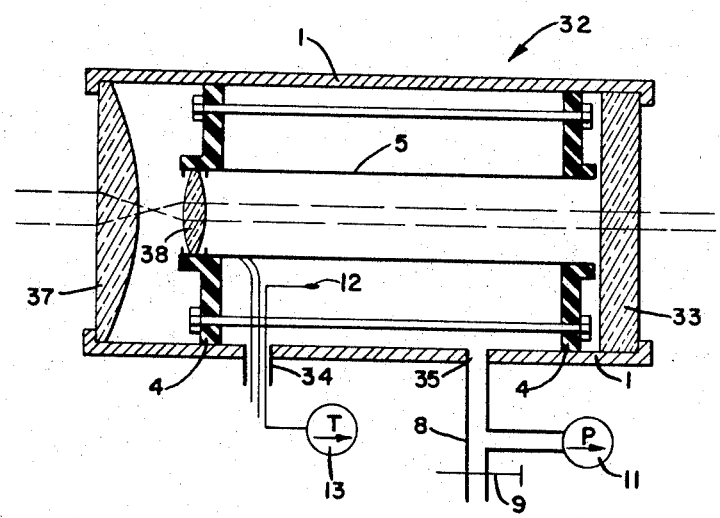
FIGURE 5 is a cross-sectional view of laser beam intensity measuring equipment, including the feature of narrowing the beam cross-sectional area.

In those instances wherein it is necessary to reduce the cross-sectional area of the laser beam, the apparatus of FIGURE 5 is utilized for detector 32, FIGURE 3. In FIGURE 5, the end of the detector into which the coherent energy is initially coupled is provided with focussing lens 37. Positioned beyond focussing lens 37 and past the focal point thereof, is double convex lens 38. Double convex lens 38 is positioned to transform the diverging laser light energy into a parallel ray, narrow light beam propagating along the axis of detector 32. Since double convex lens 38 is positioned in front of bolometer coil 5, a laser beam of very small cross-sectional area is coupled along the length of the detecting coil.

While I have described and illustrated several specific embodiments of my invention, it will be clear that variations of the details of construction which are specifically illustrated and described may be made without departing from the true spirit and scope of the invention as defined in the appended claims.

I claim:

1. A method of measuring the temperature of emission of a thermic wave comprising the steps of transmitting a thermic wave, by conduction, through a gaseous medium having known pressure and initial temperature, detecting the propagation velocity of the wave front through said medium, and determining, from the known pressure and initial temperature of the gaseous medium and the detected propagation velocity, the temperature of emission of the wave.

2. The method of claim 1 wherein velocity is detected by measuring the time required for the thermic wave to propagate between a pair of spaced points through said gaseous medium, and further including the steps of maintaining the pressure between said points substantially constant for a uniform initial temperature.

3. Apparatus for enabling the temperature of emission of a thermic wave propagating through a gas to be ascertained comprising a volume of said gas at uniform initial temperature maintained throughout its volume at constant pressure, means positioned at a first predetermined point in said gas for coupling energy from an energy source into said gas, said energy causing a thermic wave front to be propagated, by conduction, through said gas, a detector for said thermic wave front positioned at a second predetermined point in said gas, said first and second predetermined points being separated, and means responsive to coupling of said energy to said first point and detection of said energy at said second point for measuring the propagation time of said thermic wave front between said two points.

4. The apparatus of claim 3 wherein said means for coupling energy comprises a cylindrical coil responsive to a pulse of electrical energy, and said detector comprises a longitudinally extending resistance lying approximately on the longitudinal axis of said coil, said resistance being heated in response to passage of said thermic wave front and changing in value in response to said wave front.

5. The apparatus of claim 4 further including a source of high intensity pulsating electrical energy, said means for coupling being responsive to said source of energy so that said cylindrical coil transmits said thermic wave in response to derivation of a pulse of electrical energy by said energy source.

6. The apparatus of claim 3 further comprising means for monitoring the initial temperature of said gas and the pressure of said gas.

7. The apparatus of claim 3 wherein said means for coupling energy includes means transparent to beam of electromagnetic energy, said detector being positioned in said gas so that the beam of electromagnetic energy propagates along a predetermined straight path through said detector, said detector comprising a hollow cylindrical pickup element, said pickup element having a longitudinal axis coincident with the propagation path of said electromagnetic energy through said detector.

8. The apparatus of claim 7 further including means for narrowing the cross-sectional area of the electromagnetic energy propagated along the longitudinal axis of said pick-up element.

9. The apparatus of claim 3 further including a source of pulsating energy, said means for coupling being responsive to said source of pulsating energy, whereby said thermic wave front is propagated from said first predetermined point substantially simultaneously with the occurrence of a pulse of energy from said source, and wherein said means for measuring propagation time is responsive to the pulse of energy from said source.

10. The apparatus according to claim 9 wherein said detector for said thermic wave front comprises variable resistance means having its value controlled in response to the temperature thereof, said resistance means being connected in one arm of a normally balanced bridge, and means for coupling the output of said bridge to the input of said means for measuring propagation time.

11. The apparatus of claim 10 further including a display having orthogonal coordinates, means for coupling the output of said normally balanced bridge to one of said coordinates, and means for sweeping, as a substantially linear function of time, the value of said other coordinate in response to derivation by said energy source of an impulse.

12. The apparatus of claim 9 wherein said source comprises a pulsed beam of coherent optical energy, said means for coupling feeding said optical energy through said gas along a substantially straight path including said first predetermined point.

13. The apparatus of claim 12 further including means for reducing the cross-sectional area of said coherent optical energy as it propagates along the axis of said detector.

14. The apparatus of claim 12 wherein said means for coupling includes a semi-transparent mirror, said semi-transparent mirror forming a part of an optical cavity in which the laser is located.

15. The apparatus of claim 3 wherein said means for coupling energy comprises a cylindrical coil responsive to a pulse of electrical energy, and said detector comprises a longitudinally extending resistance lying approximately on the longitudinal axis of said coil, said resistance being heated in response to passage of said thermic wave front and changing in value in response to said wave front, the leads of said coil extending parallel to the longitudinally extending resistance.

No references cited

S. CLEMENT SWISHER, *Primary Examiner.*

DONALD O. WOODIEL, *Assistant Examiner.*

UNITED STATES PATENT OFFICE
CERTIFICATE OF CORRECTION

Patent No. 3,426,596                      February 11, 1969

Henry de Beaumont

It is certified that error appears in the above identified patent and that said Letters Patent are hereby corrected as shown below:

Column 3, line 55, "$20 \times 10^{-3} \text{sec.}^{-1}$" should read -- $[20 \times 10^{-3} \text{sec.}]^{-1}$ --. Column 6, line 48, after "transmitted" insert -- by the same mechanism as light --.

Signed and sealed this 24th day of March 1970.

(SEAL)
Attest:

Edward M. Fletcher, Jr.                  WILLIAM E. SCHUYLER, JR.
Attesting Officer                          Commissioner of Patents